United States Patent
Otani et al.

[11] Patent Number: 6,163,374
[45] Date of Patent: Dec. 19, 2000

[54] BENDING ANGLE DETECTION SYSTEM

[75] Inventors: Toshio Otani; Kazuhiro Oda; Toshiyuki Oenoki, all of Hirakata, Japan

[73] Assignee: Komatsu Ltd., Tokyo, Japan

[21] Appl. No.: 09/161,303

[22] Filed: Sep. 28, 1998

[30] Foreign Application Priority Data

Oct. 22, 1997 [JP] Japan .................................. 9-289369

[51] Int. Cl.[7] ............................. G01B 11/26; G01C 1/00; G01C 9/00; G06K 9/00
[52] U.S. Cl. ................... 356/152.1; 348/136; 356/152.2; 356/139.03; 382/151; 382/152; 702/151
[58] Field of Search .............................. 356/152.1, 152.2, 356/139.03; 348/136; 382/151, 152; 702/151

[56] References Cited

U.S. PATENT DOCUMENTS

| | | |
|---|---|---|
| 4,564,765 | 1/1986 | Blaich . |
| 5,164,579 | 11/1992 | Pryor et al. ......................... 356/139.03 |
| 5,311,289 | 5/1994 | Yamaoka et al. ............................. 382/8 |
| 5,329,597 | 7/1994 | Kouno et al. ................................. 382/8 |
| 5,652,805 | 7/1997 | Ooenoki et al. ......................... 382/141 |
| 5,661,671 | 8/1997 | Ooenoki et al. ......................... 382/141 |
| 5,899,964 | 5/1999 | Ooenoki et al. ......................... 702/150 |

FOREIGN PATENT DOCUMENTS 7-239221  9/1995  Japan .

*Primary Examiner*—Stephen C. Buczinski
*Attorney, Agent, or Firm*—Arent Fox Kintner Plotkin & Kahn, PLLC

[57] ABSTRACT

A bending angle detection system capable of detecting a bending angle of a workpiece with high accuracy, wherein taking into account the fact that the brightness of a linear image formed on a surface of a workpiece is higher than that of a linear image formed on other areas than the workpiece, linear images picked up from the workpiece are automatically sorted out from linear images picked up from other areas according to differences in the brightness values of the linear images so that only the data representative of the linear images formed on the workpiece can be extracted.

A linear projected light image formed on the workpiece surface is picked up by a CCD camera, a representative pixel of each scanning line on the picked up, multi-valued linear image is calculated by a representative pixel detecting unit. Based on the frequency distribution of the brightness values of the representative pixels, the workpiece representative pixel extracting unit extracts only the representative pixels associated with the linear projected light image formed on the workpiece from all the representative pixels. Based on the extracted representative pixels, a representative straight line is calculated to obtain a bending angle of the workpiece.

14 Claims, 13 Drawing Sheets

BENDING ANGLE DETECTION SYSTEM

TECHNICAL FIELD

The present invention relates to a bending angle detection system for determining a bending angle of a sheet-like workpiece when bent to a specified angle.

BACKGROUND ART

In a known bending angle detection system incorporated in a bending machine such as a press brake, a slit light or two spot lights are directed to a surface of a workpiece; a linear projected light image formed on the workpiece surface by the slit or spot light is picked up by a pickup means; and the picked up image is processed, whereby a bending angle of a workpiece is detected. For instance, Japanese Patent Publication (KOKAI) No. 7-239221 (1995) discloses a system for determining a bending angle of a workpiece. According to this publication, a linear projected light image picked up by a pickup means is processed with a known image processing technique. Specifically, the linear projected light image is digitized to form a binary image using an appropriate threshold, the binary image is thinned to have one pixel width, and then the thinned straight line having one pixel width is represented by a sequence of points (x, y), treating one pixel as a unit. From this image composed of a sequence of points, a linear equation ax+by+c=0 is calculated, using the least squares method or the like. If the length of the straight line obtained from the calculation exceeds a specified value H (e.g., one half the length of the screen), this straight line is determined as the points on the workpiece to be extracted. The inclination angle and position of this straight line on the screen is calculated, thereby determining the bending angle of the workpiece.

Figure 12A:
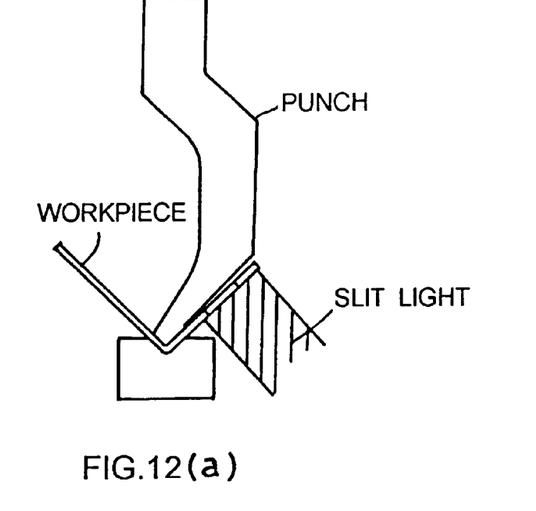
FIGS. 12(a) to 12(c) are views for explaining the problems of the prior art.
Figure 12B:
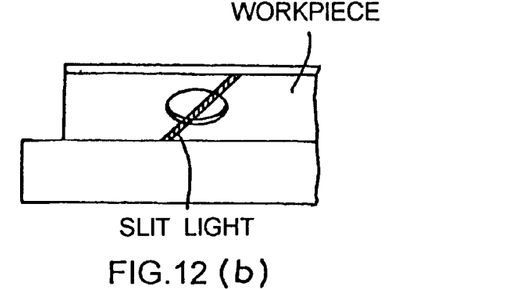
Figure 12C:
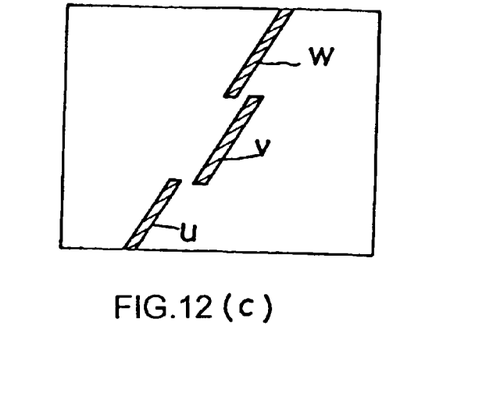

However, the bending angle detection system of Japanese Patent Publication No. 7-239221 reveals the following problems. Concretely, when detecting a bending angle of a workpiece having a hole as shown in FIGS. 12(*a*) and 12(*b*), three types of line segments u, v, w as shown in FIGS. 12(*c*) are recognized. Since any of these line segments does not have a length exceeding the specified length H, there occurs an error in the measurement of the bending angle of the workpiece. To cope with this situation, it is conceivable to select the length of the longest line segment as the specified length H. However, if the line segment v corresponding to the hole is longer than the line segments u, w which respectively correspond to a solid part of the workpiece, the line segment corresponding to the hole is extracted, so that the bending angle of the workpiece cannot be accurately measured. In cases where the line segment u corresponding to a solid part is the longest, only the line segment u is extracted as a bright line data to be utilized in the bending angle measurement, and therefore the amount of data used for the measurement is small, compared to the measurement based on the two line segments u and w which originally constitute one line. A small amount of data also leads to poor detection accuracy.

Figure 13A:
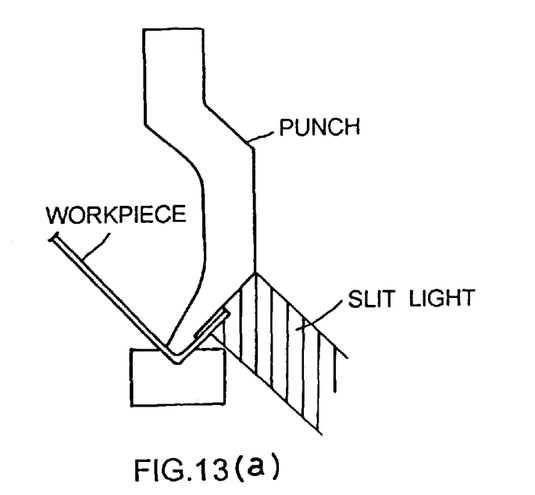
FIGS. 13(a) to 13(c) are views for explaining the problems of the prior art.
Figure 13B:
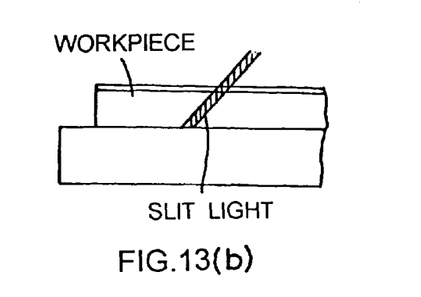
Figure 13C:
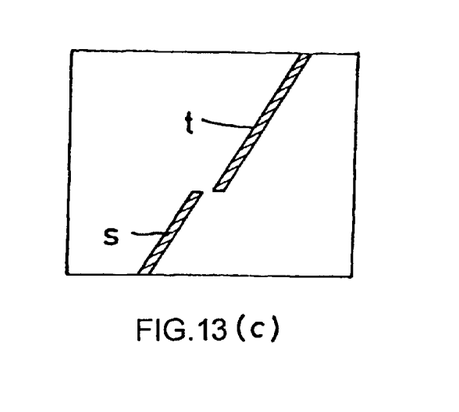

There arises another problem when detecting a bending angle of a workpiece having a short leg as shown in FIGS. 13(*a*) and 13(*b*). In this case, two types of line segments, that is, a line segment s which corresponds to the light projected onto the workpiece and a line segment t which corresponds to the light projected onto the punch (upper die) are recognized, as shown in FIG. 13(*c*). As the line segment s is shorter than the specified length H because of the short leg of the workpiece, the line segment t is recognized as the line to be used for the measurement by mistake, which results in a failure in bending angle detection.

With a view to overcoming the above problems, Japanese Patent Publication No. 7-239221 proposes techniques for excluding data on bright lines formed on other areas than the workpiece. They are (1) a method for eliminating noise by performing arithmetic operation on images obtained before and after projection of a slit light or the like and (2) a method for eliminating noise by making brightness values equal to or lower than a predetermined threshold zero. These methods, however, have their respective disadvantages. In the method (1), a bright line formed on the fixed part of the die (lower die) etc. is erasable by the arithmetic operation on the images but it is difficult to eliminate a bright line formed on the movable part of the punch (upper die) etc. by the arithmetic operation. In the method (2), the threshold should be changed according to reflectance which varies with ambient light, the surface condition of the workpiece and other factors and according to the instrumental errors of the pickup device, which gives rise to difficulty in determining the threshold. The publication teaches that, in order to more effectively carry out the method (2), reflected light from other areas than the workpiece is weakened by applying surface treatment (e.g., painting) to machine parts so that undesirable data due to reflected light from the machine parts can be made to be lower than the threshold. However, this attempt reveals the problem that the paint comes off after use, with the result that reflected light from the machine parts gradually increases.

The present invention is directed to overcoming the foregoing problems, and one of the objects of the invention is therefore to provide a bending angle detection system capable of detecting a bending angle of a workpiece with high accuracy, wherein taking into account the fact that the brightness of a linear image formed on a surface of a workpiece is higher than that of a linear image formed on other areas than the workpiece, linear images picked up from the workpiece are automatically sorted out from linear images picked up from other areas according to differences in the brightness values of the linear images so that only the data representative of the linear images formed on the workpiece can be extracted.

DISCLOSURE OF THE INVENTION

The above object can be accomplished by a bending angle detection system for determining a bending angle of a workpiece by image processing according to the invention, the system comprising:

(a) light projector means for projecting light at a specified angle onto a surface of a workpiece to form a linear projected light image on the workpiece surface;

(b) pickup means for picking up an image of the surface of the workpiece on which the linear projected light image has been formed by the light projector means;

(c) representative pixel detecting means for determining a representative pixel of each scanning line on the image picked up by the pickup means from the distribution of the brightness values of pixels lying on the scanning line;

(d) workpiece representative pixel extracting means for extracting representative pixels associated with the linear projected light image formed on the workpiece surface, based on the frequency distribution of the brightness values of the representative pixels determined by the representative pixel detecting means;

(e) representative straight line computing means for computing a representative straight line associated with the linear projected light image formed on the workpiece surface from the plurality of representative pixels extracted by the workpiece representative pixel extracting means; and (f) bending angle computing means for computing a bending angle of the workpiece based on the representative straight line computed by the representative straight line computing means.

In the above system constructed according to the invention, light is projected by the light projector means onto a surface of a workpiece being bent to a specified angle, to form a linear projected light image which is then picked up by the pickup means. Then, the representative pixel detecting means computes the distribution of brightness of each scanning line of the picked up image, and determines, based on the distribution, a representative pixel for each scanning line. The workpiece representative pixel detecting means extracts only representative pixels associated with the linear projected light image formed on the workpiece surface from all the representative pixels, based on the frequency distribution of the brightness values of the detected representative pixels. The representative straight line computing means computes a representative straight line from the obtained representative pixels associated with the image on the workpiece surface and then, the bending angle computing means computes a bending angle of the workpiece based on the representative straight line.

According to the invention, since only the representative pixels associated with the linear projected light image formed on the workpiece surface are extracted, based on the frequency distribution of the brightness values of all the detected representative pixels and a representative straight line is determined based on the representative pixels associated with the image formed on the workpiece surface only, high accuracy bending angle detection can be performed even if the workpiece to be measured has, for example, a hole or short leg.

The bending angle detection system of the invention further comprises noise eliminating means for eliminating noise from the image picked up by the pickup means prior to the detection of the representative pixels by the representative pixel detecting means. Use of this means leads to a further improvement in the accuracy of the representative pixel detection and, in consequence, an improvement in the accuracy of the bending angle detection.

The noise eliminating means may be designed to eliminate noise by subtraction on the brightness values of pixels obtained before and after image formation; making brightness values equal to or lower than a specified threshold zero; or making the brightness value of each isolated pixel zero, the pixels adjacent of the isolated pixel having a brightness of zero.

The light projector means may project a slit light or a plurality of spot lights aligned in series onto a surface of a workpiece to form a linear projected light image on the workpiece surface.

The representative pixel detecting means may be designed such that the center of gravity of the distribution of the brightness values of pixels lying on each scanning line is obtained and the pixel corresponding to the center of gravity is determined to be the representative pixel for the scanning line, or such that the pixel having the highest brightness value in each scanning line is determined to be the representative pixel for the scanning line. Alternatively, the representative pixel detecting means may be designed such that the half width of the brightness value of each pixel lying on each scanning line is obtained from the distribution of brightness and the pixel having half width equal to the central value of the half width values is determined to be the representative pixel for the scanning line.

Preferably, the workpiece representative pixel extracting means judges whether or not the frequency distribution of the brightness values of the representative pixels is a normal distribution and if it is determined to be a normal distribution, the extracting means extracts the representative pixels associated with the linear projected light image formed on the workpiece surface from all the representative pixels obtained from the picked up image. In this arrangement, when the distribution of the brightness values of all the representative pixels is a normal distribution, it is judged that the whole linear projected light image which has been picked up is formed from the light projected onto the surface of the workpiece, and therefore, it is possible to calculate a representative straight line based on many representative pixels, which, in consequence, entails high accuracy in the detection of the bending angle of the workpiece.

Preferably, the workpiece representative pixel extracting means judges whether or not the frequency distribution of the brightness values of all the representative pixels is a normal distribution and if it is not determined to be a normal distribution, the extracting means extracts the representative pixels associated with the linear projected light image formed on the workpiece surface from the representative pixels which constitute the normal distribution having the highest brightness value. In this arrangement, when the frequency distribution of the brightness values of all the representative pixels is not a normal distribution, it is judged that the linear projected light image which has been picked up is formed from the light projected onto the workpiece surface and the light projected onto other areas than the workpiece. In this case, the fact that the brightness value of a linear projected light image formed on the workpiece is higher than that of a linear projected light image formed on other areas than the workpiece is taken into account, and the normal distribution having the highest brightness value is used for extracting the representative pixels associated with the linear projected light image formed on the workpiece surface. In this way, the representative straight line is calculated using the representative pixels associated with the linear image formed from the light projected onto the workpiece surface. Therefore, even when dealing with a workpiece having, for example, a hole or short leg, the representative pixels associated with the image on the workpiece only can be extracted, resulting in highly accurate bending angle detection.

The judgement as to whether the frequency distribution of the brightness values of the representative pixels is a normal distribution may be carried out using a statistical technique or carried out by determining whether the standard deviation of the frequency distribution is less than a predetermined value.

Another example of the workpiece representative pixel extracting means is such that the average brightness value in the frequency distribution of the brightness values of the representative pixels is obtained and the representative pixels having brightness values higher than the average value are extracted as the representative pixels associated with the linear projected light image formed on the workpiece surface. This facilitates the extraction of the bright line image formed on the workpiece.

Preferably, the representative straight line computing means obtains the representative straight line by calculating an approximate straight line from the plurality of extracted representative pixels, using the least squares method.

BEST MODE FOR CARRYING OUT THE INVENTION

Referring now to the drawings, a bending angle detection system embodying the invention will be described.

Figure 1:
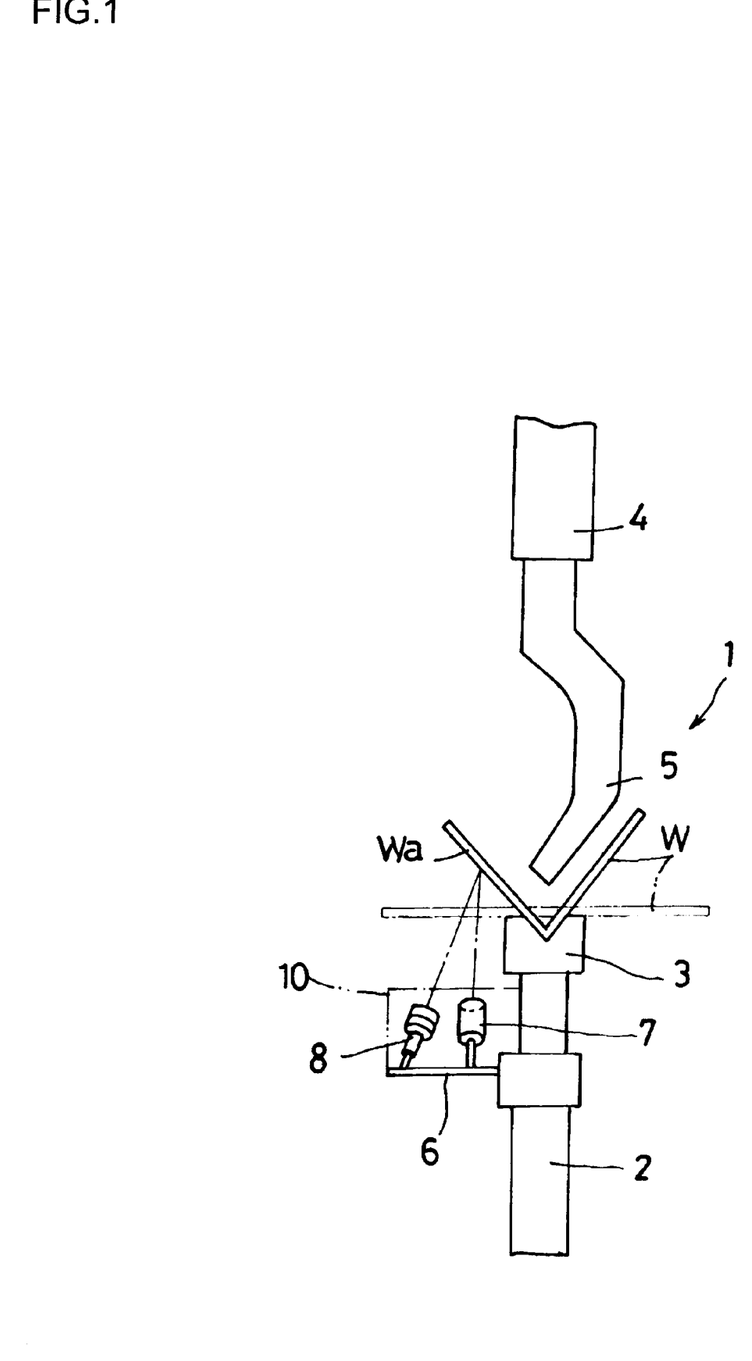
FIG. 1 is a side elevation showing essential parts of a press brake to which a bending angle detection system constructed according to one embodiment of the invention is applied.
Figure 2:
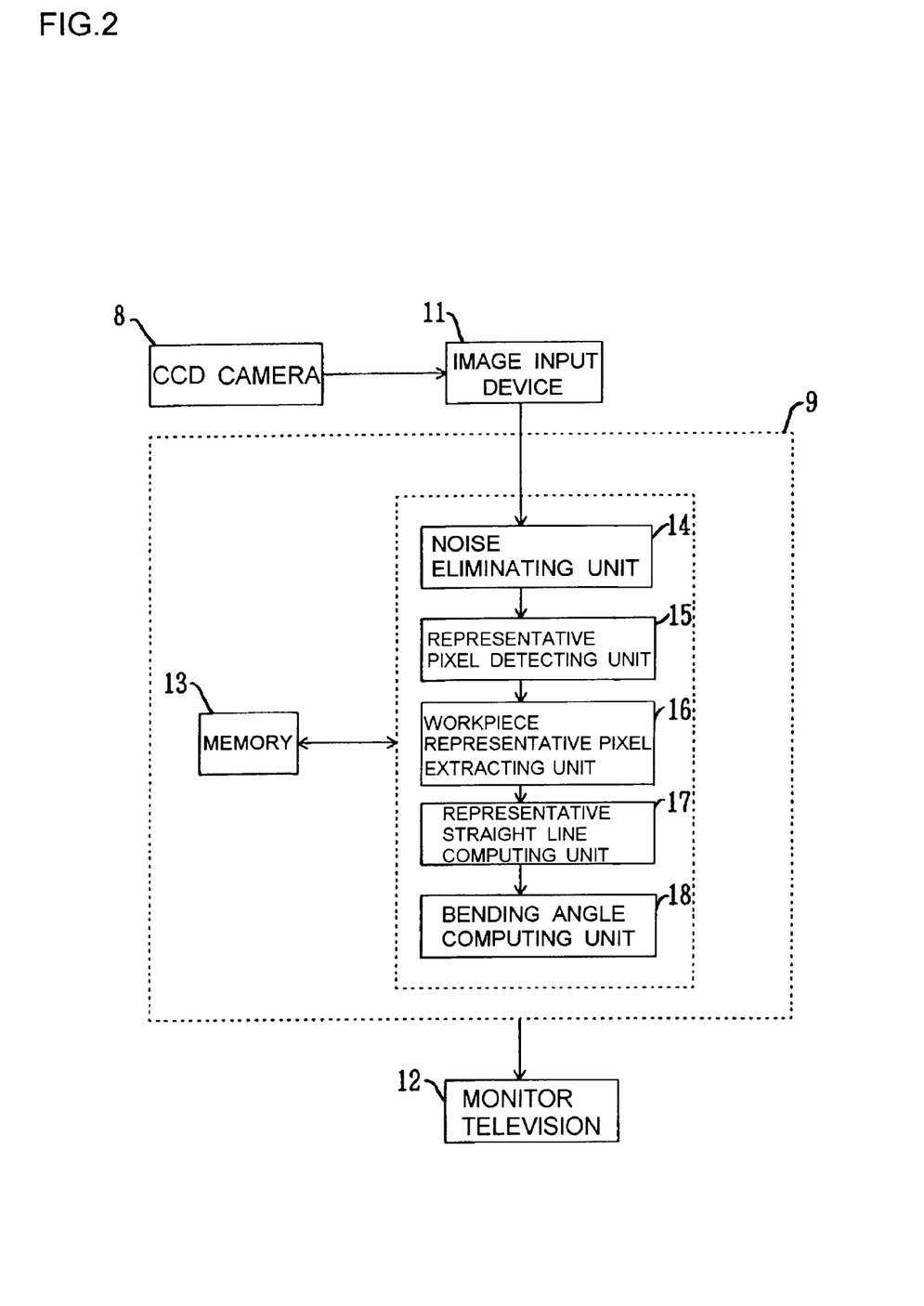
FIG. 2 is a block diagram of the bending angle detection system according to the embodiment.

FIG. 1 is a side elevation showing essential parts of a press brake to which a bending angle detection system constructed according to one embodiment of the invention is applied, and FIG. 2 is a block diagram of the bending angle detection system of this embodiment.

In the present embodiment, a press brake 1 comprises a lower die (die) 3 supported on a mount 2 and an upper die (punch) 5 that is arranged in opposing relationship with the lower die 3, being attached to the underside of a ram 4. The ram 4 is so disposed as to be lifted and lowered above the lower die 3. Inserted between the lower die 3 and the upper die 5 is a workpiece W formed from a metal sheet. Bending of the workpiece W is performed by lowering the ram 4 to press the workpiece W placed on the lower die 3 with both lower and upper dies 3, 5.

A bracket 6 supported in front of the mount 2 (i.e., on the operator side) supports an angle measuring unit 10 which has a light source 7 (light projector means) for projecting a slit light to form a linear projected light image on the outer bent surface Wa of the workpiece W. The angle measuring unit 10 also includes a CCD camera 8 for picking up the linear projected light image formed on the outer bent surface Wa by the light source 7. The CCD camera 8 is connected to an arithmetic unit 9 for calculating the angle of the workpiece by processing the linear projected light image (i.e., the picked up image of a bright line) picked up by the CCD camera 8.

The angle measuring unit 10 may be positioned behind the mount 2 (i.e., on the machine side) instead of in front of the mount 2 or may be disposed on both sides.

The linear projected light image which has been picked up by the CCD camera 8 is entered as a multi-valued image in the arithmetic unit 9 through an image input device 11, as shown in FIG. 2. This multi-valued image is composed of, for instance, 420 (column)×510 (row) pixels and these pixels have brightness of 256 (0 to 255) tones. The arithmetic unit 9 is connected to a monitor television 12 for displaying the input linear projected light image as required and equipped with a memory 13 for storing data on the linear projected light image which has been picked up.

Figure 3:
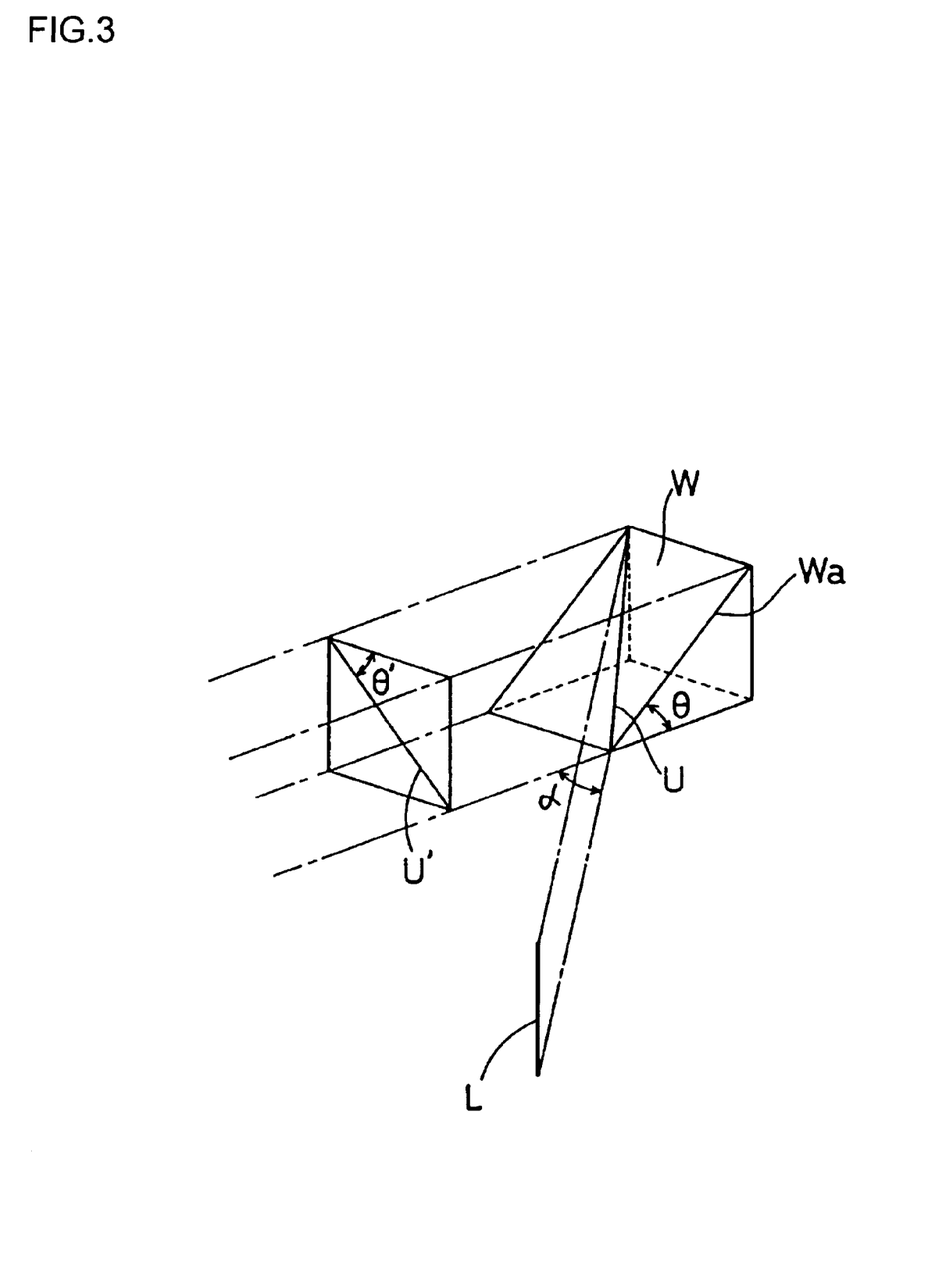
FIG. 3 illustrates the positional relationship between a light source, workpiece and CCD camera employed in the system according to the embodiment.

FIG. 3 shows the relationship between a slit light L, a linear projected light image U formed on the workpiece W and a picked up linear projected light image U', when the slit light L is projected onto the outer bent surface Wa of the workpiece W from the slit light source 7, forming the linear projected light image U and this image U is picked up by the CCD camera 8 to output to the monitor television 12 as the picked up linear projected light image U'. The relationship between the projecting angle α of the slit light L; the angle θ' of the picked up linear projected light image U'; and the angle θ of the workpiece is described by the following equation.

$$\tan \theta' = \tan \alpha \cdot \tan \theta$$

It should be noted that the angle of view of the lens is not taken into account in this equation. Therefore, calibration data (see Japanese Patent Publication No. 7-239221) are stored in the memory 13 beforehand. The linear projected light image U' is defined as a straight line by image processing, and the relationship between the inclination angle θ' and the workpiece angle θ is calibrated with corresponding data obtained from the stored calibration data using the position of the straight line as a parameter.

The arithmetic unit 9 comprises (i) a noise eliminating unit 14 for eliminating noise contained in the multi-valued image entered in the arithmetic unit 9 through the image input device 11; (ii) a representative pixel detecting unit 15 which calculates the distribution of brightness values relative to pixels lying on each scanning line of the multi-valued image from which noise has been eliminated by the noise eliminating means and which detects representative pixels of the optical axes in the bright region from the above distribution; (iii) a workpiece representative pixel extracting unit 16 for extracting representative pixels associated with the linear projected light image formed on the workpiece W, based on the frequency distribution of the brightness values of the representative pixels detected by the representative pixel detecting unit 15; (iv) a representative straight line computing unit 17 for computing a representative straight line from the plurality of representative pixels extracted by the workpiece representative pixel extracting unit 16, using a mathematical approximation technique such as the least squares method; and (v) a bending angle computing unit 18 for obtaining a bending angle of the workpiece W from the calibration data according to the representative straight line computed by the representative straight line computing unit 17.

Figure 4:
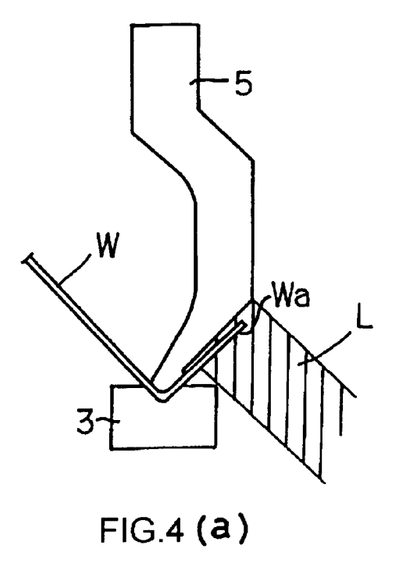
FIGS. 4(a) and 4(b) are a side elevation and partial front elevation, respectively, of a workpiece W being bent according to the embodiment.

A method of detecting a bending angle of the workpiece W is explained by way of an example where the workpiece W has a short leg and 65% of the slit light L is projected onto the surface of the workpiece W, while 35% of the slit light L is projected onto the surface of the punch 5, as shown in FIG. 4.

Figure 5A:
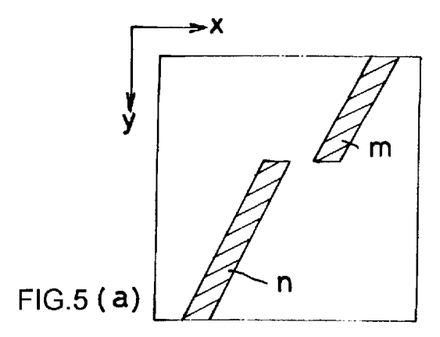
FIG. 5(a) through (d) illustrate process for extracting a representative straight line according to the embodiment.
Figure 5B:
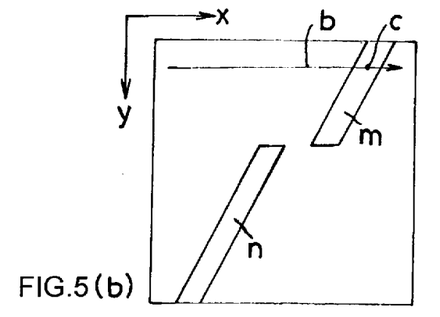

In this example, a multi-valued image having two linear bright regions m, n is taken in the arithmetic unit 9 through the image input device 11, as shown in FIG. 5(a). The noise eliminating unit 14 eliminates noise from the multiple-value image taken in the arithmetic unit 9 by a known manner. Thereafter, the representative pixel detecting unit 15 calculates the distribution of the brightness values of the pixels in each array (i.e., scanning line) b extending in the direction of the x-axis of the coordinate (x, y) system of the multi-valued image. Based on this brightness distribution, a representative pixel c is determined (see FIG. 5(*b*)).

Figure 5C:
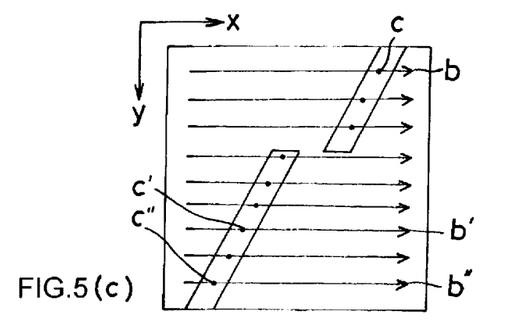
Figure 6:
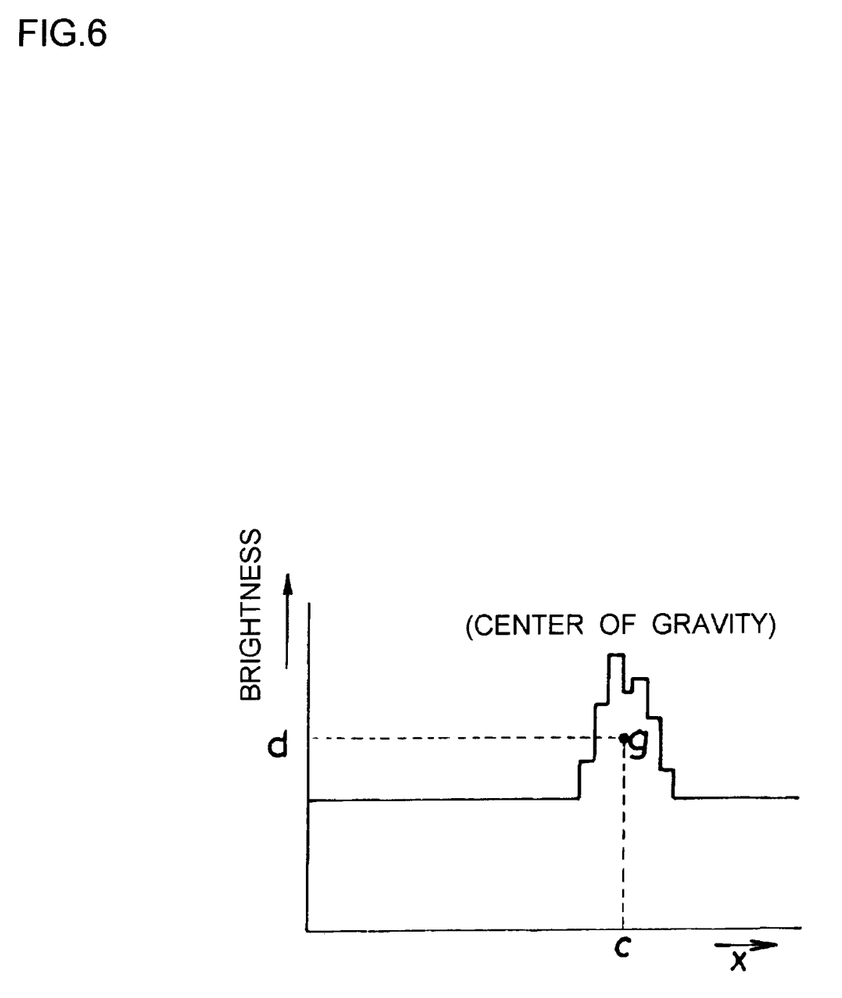
FIG. 6 shows a brightness distribution used in the description of representative pixels and a method for calculating their brightness values according to the embodiment.

As shown in FIG. 6, the representative pixel c is calculated from the center of gravity g of the brightness distribution of the pixels in the scanning line b, and the brightness value d of the representative pixel c is also calculated. This representative pixel calculation is repeated to detect the representative pixels c', c" . . . of other scanning lines b', b" . . . as a series of points on the picked up image (see FIG. 5(*c*)).

Figure 5D:
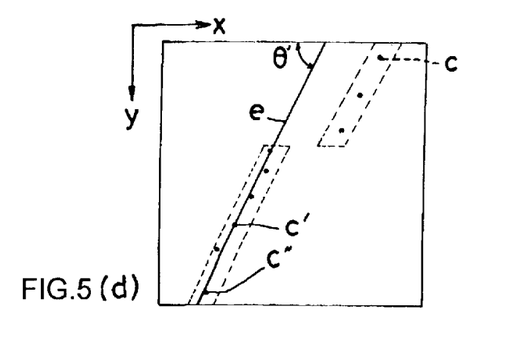
Figure 7:
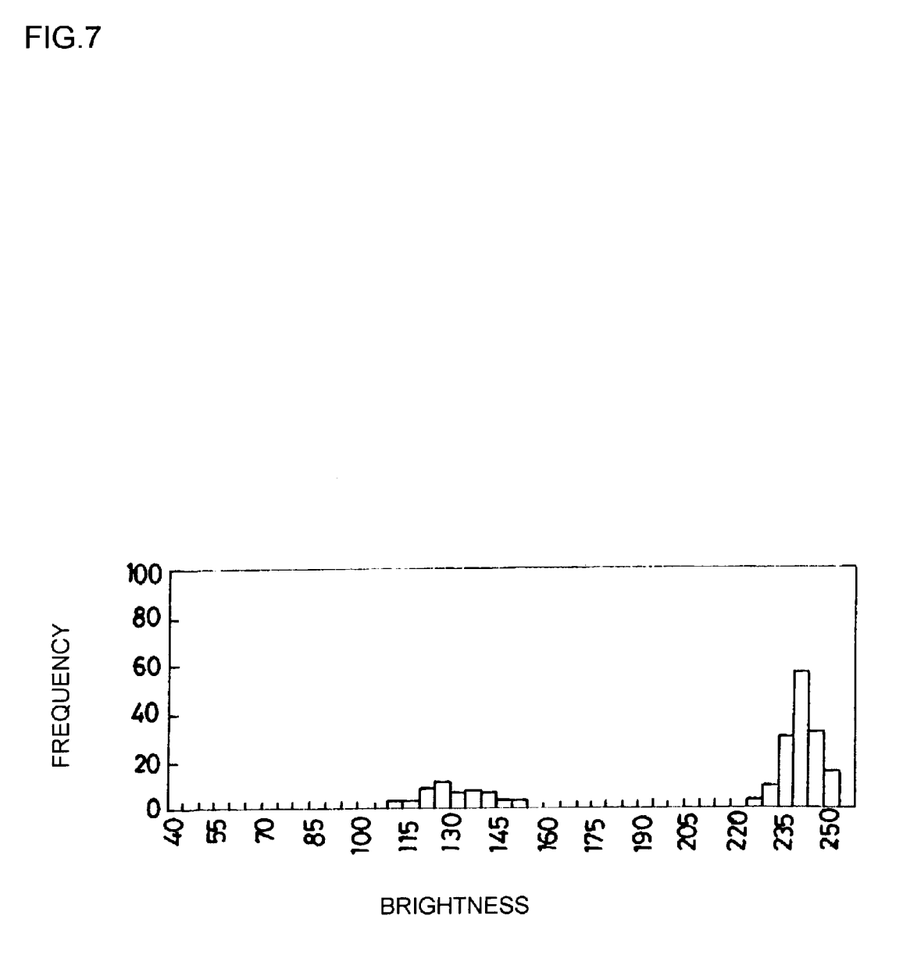
FIG. 7 shows the frequency distribution of the calculated brightness values of the representative pixels according to the embodiment.

The frequency distribution of the brightness values d, d', d" . . . of the representative pixels c, c', c" . . . thus calculated is shown in FIG. 7. In cases where there are linear projected light images formed on other areas than the workpiece W, the frequency distribution is not a normal distribution but has more than two peak values, as shown in FIG. 7. In this case, based on the result of the arithmetic operation, the workpiece representative pixel extracting unit 16 extracts only the representative pixels c', c" . . . corresponding to the brightness values d', d" which constitute the normal distribution having the highest peak, while deleting other data. This is on the ground of the fact that the brightness of a linear projected light image formed on the workpiece W is higher than that of a linear projected light image formed on other areas than the workpiece W. Therefore, it is judged that the normal distribution having the highest brightness derives from the linear projected light image formed on the workpiece W and other data are related to the projected light image formed on other areas than the workpiece. From the extracted representative pixels c', c" . . . , that is, a series of representative pixels associated with the linear projected light image formed on the workpiece W, the representative straight line computing unit 17 obtains a representative straight line e, using a mathematical approximation technique such as the least squares method (FIG. 5(*d*)).

Thereafter, the bending angle computing unit 18 obtains the bending angle of the workpiece W, by searching data in the carburization data stored in the memory 13 with the inclination angle θ' and position x of the representative straight line e. It should be noted that the position x is given by the intersection X of the representative straight line e and a straight line y=Y/2 (Y=the number of pixels aligned in the direction of y axis) drawn, for example, in the center of the screen of the monitor television 12.

Figure 8:
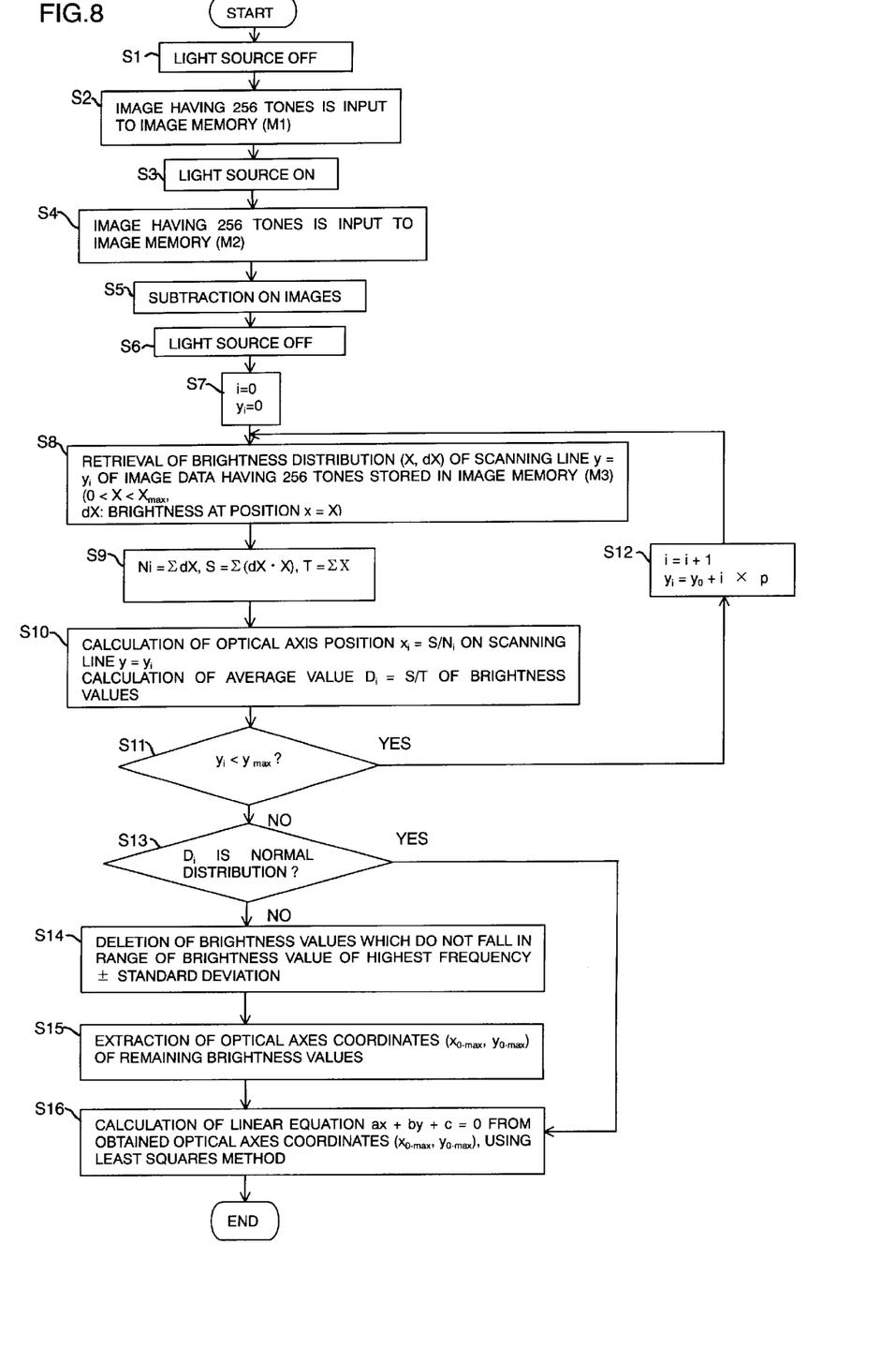
FIG. 8 is a flow chart of a representative straight line extraction process according to the embodiment.

Next, reference is made to the flow chart of FIG. 8 to describe the process of extracting a representative straight line in detail.

S1 to S6: The light source for projecting light to form a linear image on the workpiece W is turned off, and an image having 256 tones is input to the image memory (M1). Subsequently, the light source is turned on and an image having 256 tones is input to the image memory (M2). Then, subtraction on the images input in the two memories M1, M2 (M3=M2−M1) is performed and the light source is again turned off. In this way, the image to be processed is taken in and noise in the image (i.e., unnecessary portion of brightness) is eliminated by the subtraction of the image obtained before projection of a slit light from the light source from the image obtained after the projection.

S7 to S10: Number i indicative of the number of optical axes (optical-axes coordinates) is set to zero and the initial value ($y_0$) of scanning line $y_i$, is set to zero. Then, the brightness distribution (X, dX) of a scanning line y=$y_i$ on the image data having 256 tones stored in the image memory (M3) is retrieved. dX represents the brightness value (0 to 255) at the position x=X and X satisfies 0 <$X_{max}$ ($X_{max}$ represents the number of pixels aligned in the direction of x-axis). To obtain the center of gravity of the brightness distribution, the total T=ΣX of the positions X, the total $N_i$=ΣdX of the brightness values and the total S=Σ(dX·X) of the products of the coordinate X and the brightness value dX corresponding to the coordinate X are obtained. Then, the position of the optical axis (the position of the representative pixel) $X_i$ on the scanning line y=$y_i$ is obtained from $N_i$ and S, using the equation $X_i$=S/$N_i$, and the average value $D_i$ of the brightness values is obtained from the equation $D_i$=S/T.

S11 to S12: If $y_i$ does not reach $y_{max}$ (the number of pixels in the direction of y-axis), the number i is incremented by 1 and the scanning line $y_i$ is advanced by a scan spacing (pitch) p in the direction of y-axis ($y_i$=$y_0$+i×p). The processes on and after Step S8 are repeated until $y_i$ reaches $y_{max}$.

S13 to S15: It is determined by a statistical technique whether the average value $D_i$ (the frequency distribution) of the brightness values dX of pixels on each scanning line is a normal distribution. If it is not a normal distribution, the brightness values which do not fall within the range of (the brightness value of the highest frequency±a standard deviation) are regarded as the brightness values associated with other areas than the workpiece so that the data on these brightness values are deleted. Then, the coordinates ($x_{0-max}$, $y_{0-max}$) of the optical axes are extracted from the remaining plurality of brightness values. On the other hand, if the average value $D_i$ is a normal distribution, the program proceeds to step S16, without performing the processes of Steps S14, S15.

S16: From the coordinates ($x_{0-max}$, $y_{0-max}$) of the optical axes obtained when the average value $D_i$ is a normal distribution or the coordinates ($x_{0-max}$, $y_{0-max}$) of the optical axes obtained in Step S15, a representative straight line (approximate line) ax+by+c=0 is obtained.

The brightness value of the linear image of light projected onto the die (lower die) 3 is higher than the brightness value of the linear projected light image formed on the workpiece surface in some cases, but this can be satisfactorily deleted by the known arithmetic operation performed on images.

The system of this embodiment is designed to detect a bending angle of the workpiece by sorting out linear projected light images formed on the workpiece surface from those formed on other areas than the workpiece and then extracting only the linear projected light images formed on the workpiece. Therefore, even if a workpiece having a hole or short leg is measured, only linear projected light images formed on the workpiece can be extracted, resulting in accurate detection of a bending angle of the workpiece.

Figure 9A:
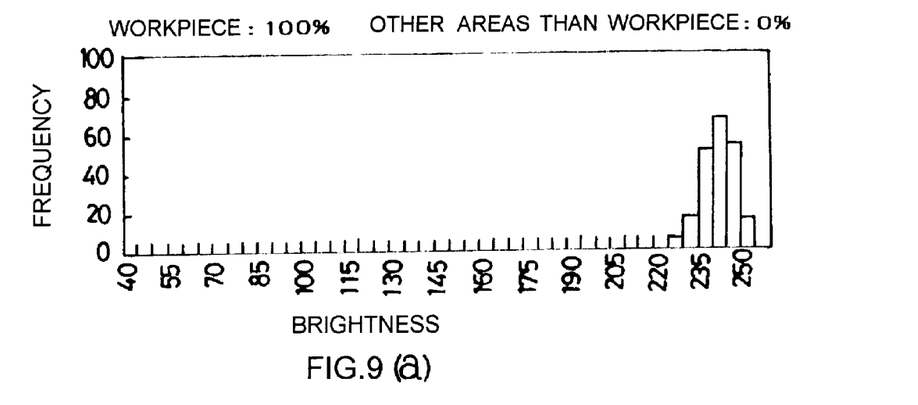
FIGS. 9(a), 9(b) and 9(c) show the frequency distributions of brightness values in linear images picked up from a workpiece and other areas at different ratios.
Figure 9B:
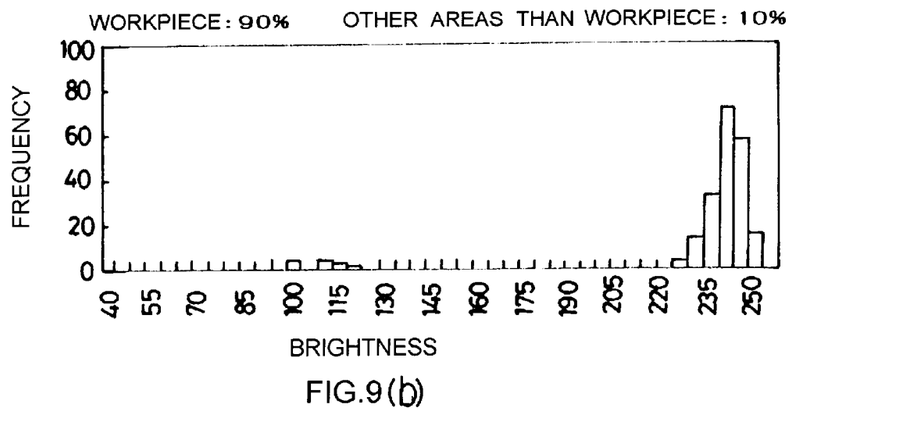
Figure 9C:
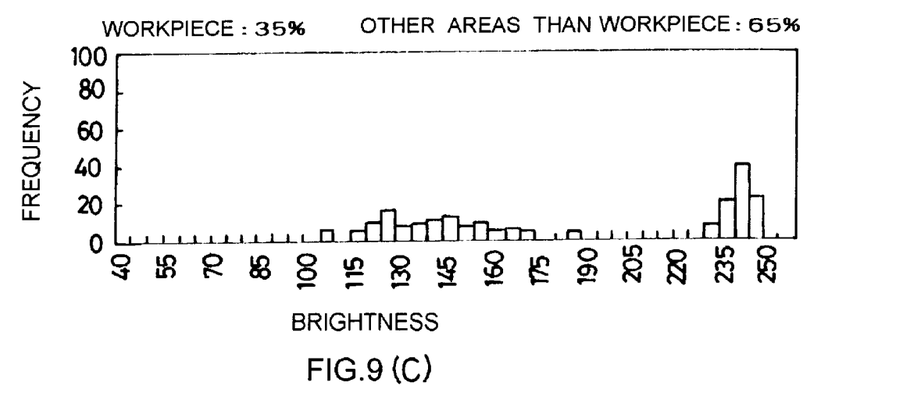

While the judgement as to whether or not the frequency distribution of the brightness values of the scanning lines is a normal distribution is carried out with a statistical technique in the present embodiment, this judgement may be made by the degree of the standard deviation. FIG. 9(*a*) shows the frequency distribution of the brightness of a light image formed on the workpiece only; FIG. 9(*b*) shows the frequency distribution of the brightness of 90% an image formed on the workpiece and 10% an image formed on other areas; FIG. 9(*c*) shows the frequency distribution of the brightness of 35% an image formed on the workpiece and 65% an image formed on other areas. Using these frequency distributions, the standard deviation of each case was obtained. The standard deviation of the image of 100% the workpiece W is 5. The standard deviations in the cases of 10% other areas, 35% other areas (see FIG. 7) and 65% other areas are 41, 54 and 52, respectively. It is understood from this result that when the standard deviation is, for instance, 30 or more (this threshold value should be determined by confirming various data), an image formed on other areas than the workpiece is included in the picked-up image.

In the above embodiment, pixel data having brightness values which fall within the range of (the brightness value having the highest frequency in all the brightness values±the standard deviation) are extracted, in order to extract the pixel data of the bright line formed on the workpiece W. The extraction method of image data associated with the workpiece may be designed such that the average of brightness values (the total of all brightness values is divided by frequency) is first obtained, brightness values lower than the average value are deleted, being regarded as the bright lines formed on other areas than the workpiece, while pixel data having brightness values higher than the average value are extracted. With this arrangement, the bright line formed on the workpiece can be easily extracted.

While the linear projected light image is formed by a slit light in the present embodiment, an alternative arrangement is such that a plurality of spot lights aligned in series are projected instead of a slit light and an approximate curve passing through the center of each spot light is obtained by arithmetic operation thereby obtaining the angle of the projected light image.

While noise contained in the picked up image is eliminated by subtraction of an image obtained before light beam projection from an image obtained after the light beam projection in the present embodiment, the following alternative arrangements may be made for noise elimination. (1) A specified threshold is set for brightness values and brightness values equal to or lower than the threshold are made to be zero, thereby to eliminate noise. (2) The brightness values of isolated pixels, of which adjacent pixels have a brightness of zero, are made to be zero, thereby eliminating noise.

Figure 10:
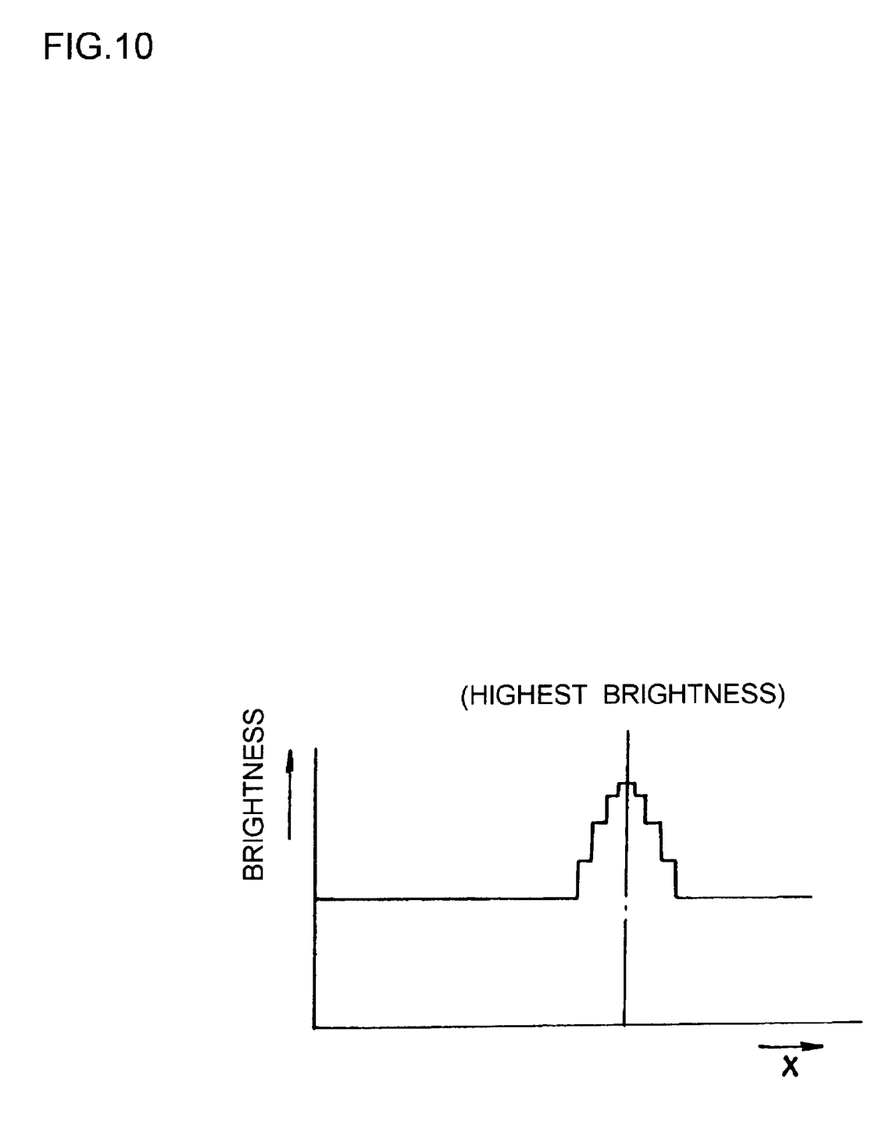
FIG. 10 shows another method for calculating representative pixels.
Figure 11:
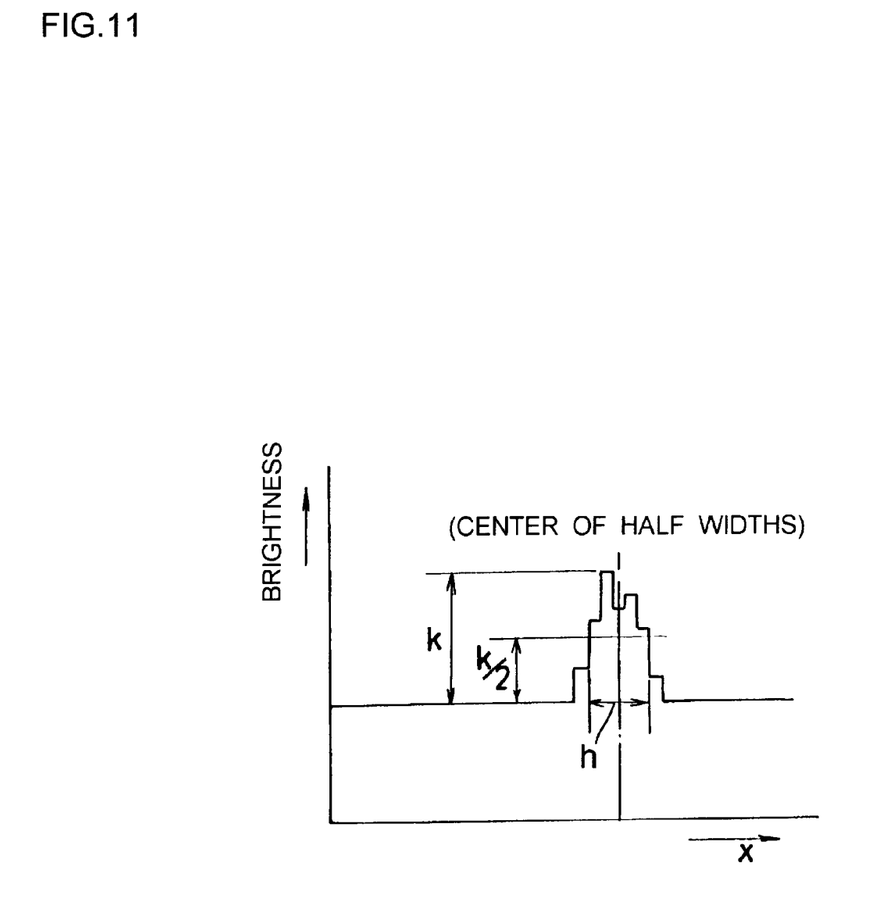
FIG. 11 shows still another method for calculating representative pixels.

While the center of gravity of brightness values is obtained from the distribution of the brightness values of pixels lying on a specified coordinate axis, for detecting a representative pixel in the present embodiment, the following alternative arrangements may be made. (1) The pixel having the highest brightness value is determined to be the representative pixel (see FIG. 10). (2) The respective half widths h of the brightness values of the pixels lying on a specified coordinate axis are obtained from the distribution of the brightness values, and the pixel having half width equal to the central value of the half widths is determined to be the representative pixel (see FIG. 11). The method (1) is particularly useful in cases where there is no irregularity in color on the surface of the workpiece. Like the above-described method where the center of gravity of the distribution is utilized, the method (2) is useful in cases where the distribution of the brightness values of the representative pixels is not a normal distribution.

What is claimed is:

1. A bending angle detection system for determining a bending angle of a workpiece by image processing, the system comprising:
    (a) light projector means for projecting light at a specified angle onto a surface of a workpiece to form a linear projected light image on the workpiece surface;
    (b) pickup means for picking up an image of the surface of the workpiece on which the linear projected light image has been formed by the light projector means;
    (c) representative pixel detecting means for determining a representative pixel of each scanning line on the image picked up by the pickup means from the distribution of the brightness values of pixels lying on said scanning line;
    (d) workpiece representative pixel extracting means for extracting representative pixels associated with the linear projected light image formed on the workpiece surface, based on the frequency distribution of the brightness values of the representative pixels determined by the representative pixel detecting means;
    (e) representative straight line computing means for computing a representative straight line associated with the linear projected light image formed on the workpiece surface from the plurality of representative pixels extracted by the workpiece representative pixel extracting means; and
    (f) bending angle computing means for computing a bending angle of the workpiece based on the representative straight line computed by the representative straight line computing means.

2. A bending angle detection system according to claim 1, which further comprises noise eliminating means for eliminating noise from the image picked up by the pickup means prior to the detection of the representative pixels by the representative pixel detecting means.

3. A bending angle detection system according to claim 2, wherein said noise eliminating means eliminates noise by subtraction on the brightness values of pixels obtained before and after the formation of the image.

4. A bending angle detection system according to claim 2, wherein said noise eliminating means eliminates noise by making brightness values equal to or lower than a specified threshold zero.

5. A bending angle detection system according to claim 2, wherein said noise eliminating means eliminates noise by making the brightness value of each isolated pixel zero, the adjacent pixels of said each isolated pixel having a brightness of zero.

6. A bending angle detection system according to claim 1, wherein said light projector means projects a slit light or a series of spot lights onto the surface of the workpiece to form the linear projected light image on the workpiece surface.

7. A bending angle detection system according to claim 1, wherein said representative pixel detecting means obtains the center of gravity of the distribution of the brightness values of pixels lying on each scanning line and determines the pixel corresponding to the center of gravity to be the representative pixel for said scanning line.

8. A bending angle detection system according to claim 1, wherein said representative pixel detecting means determines the pixel having the highest brightness value on each scanning line to be the representative pixel for said scanning line.

9. A bending angle detection system according to claim 1, wherein said representative pixel detecting means obtains the half width of the brightness value of each pixel lying on each scanning line from the distribution of the brightness values of the pixels on said scanning line and determines the pixel having half width corresponding to the central value of the half widths to be the representative pixel for said scanning line.

10. A bending angle detection system according to claim 1, wherein said workpiece representative pixel extracting means judges whether or not the frequency distribution of the brightness values of the representative pixels is a normal distribution and if it is determined to be a normal distribution, said extracting means extracts the representative pixels associated with the linear projected light image formed on the workpiece surface from all the representative pixels obtained from the picked up image.

11. A bending angle detection system according to claim 1, wherein said workpiece representative pixel extracting means judges whether or not the frequency distribution of the brightness values of the representative pixels is a normal distribution and if it is not determined to be a normal distribution, said extracting means extracts the representative pixels associated with the linear projected light image formed on the workpiece surface from the representative pixels which constitute a normal distribution having the highest brightness value.

12. A bending angle detection system according to claim 10 or 11, wherein the judgement as to whether or not the frequency distribution of the brightness values is a normal distribution is made by determining whether the standard deviation of the frequency distribution is below a specified value.

13. A bending angle detection system according to claim 1, wherein said workpiece representative pixel extracting means obtains the average value of the brightness values in the frequency distribution of the brightness values of the representative pixels and extracts the representative pixels having brightness values higher than the average value as the representative pixels associated with the linear projected light image formed on the workpiece surface.

14. A bending angle detection system according to claim 1, wherein said representative straight line computing means obtains the representative straight line by calculating an approximate straight line from the plurality of extracted representative pixels, using the least squares method.

* * * * *